UNITED STATES PATENT OFFICE.

JOSEPH L. K. SNYDER, OF CLEVELAND, OHIO, ASSIGNOR TO NATIONAL CARBON COMPANY, OF CLEVELAND, OHIO, A CORPORATION OF NEW JERSEY.

PROCESS OF APPLYING PROTECTING-GLAZE TO CARBON ELECTRODES.

1,000,761.  Specification of Letters Patent.  Patented Aug. 15, 1911.

No Drawing.  Application filed September 6, 1910. Serial No. 580,687.

*To all whom it may concern:*

Be it known that I, JOSEPH L. K. SNYDER, a citizen of the United States, residing at Cleveland, in the county of Cuyahoga and State of Ohio, have invented a certain new and useful Improvement in Processes of Applying Protecting-Glaze to Carbon Electrodes, of which the following is a full, clear, and exact description.

It has been proposed to apply to carbon electrodes, intended for use in electric smelting furnaces, a protective coating adapted to prevent the electrodes from burning away above or in the charge in the furnace when in use. It will be understood that this coating must be made of some material such that it will have no detrimental effect upon the charge in the furnace. Heretofore such protective coatings have been applied to the surface of cured or baked carbon electrodes. The curing or baking operation, however, generally produces upon said electrodes a hard, smooth skin, and it is very difficult to get any protective coating to adhere tenaciously to such electrodes, particularly when they are subjected to the heat and gases in an electric furnace.

The present invention is a process of producing such protective coating upon such carbon electrodes in a way that will cause them to be so firmly adherent that they will not come off in the corrosive zone while the electrode is in use.

The process consists in applying to the formed carbon electrode, while it is in the green, i. e., unbaked condition, and while it is therefore of a plastic nature, some material, which, under the influence of the heat employed to bake or cure the carbon electrodes, or the heat of the electric furnace in which it is finally used, will, either by fusion or chemical change, produce upon the surface of said electrode a coating of the required character.

In carrying out the process according to what I now believe to be the best specific method of procedure a paste made of a suitable chemical substance and a binder therefor is applied to the surface of the green, i. e., unbaked formed carbon electrode. A great variety of chemical substances may be employed which should be selected in view of existing conditions. If, for example, the carbon mix of which the green electrode is formed contains acid impurities, such, for example, as silicious material, the substances mixed with the binder may be sodium carbonate or some other analogous basic salt, which will combine chemically with the silicon compounds and form a slag-producing glaze on the surface of the electrode when the green carbon is subjected to sufficient heat. If the carbon mix contains basic impurities, such, for example, as ferric oxid, the substance mixed with the binder may be a suitable salt, such, for example, as potassium bisulfate, or borax, adapted to combine with such basic impurities and form a slag-producing glaze. Or some chemical may be employed such as will combine with the carbon itself to form a slag-producing glaze; for example, calcium chlorid may be used forming with the carbon calcium carbid. Pitch and tar are suitable for use as binders, but a great variety of other binders may be used, as, for example, glucose, glue and water glass.

It is obvious that when the protecting coating is formed in the manner above described, it will, because the paste was applied to the green and therefore plastic carbon, be formed partly within the pores thereof; and will, therefore, be so firmly adherent that its removal is practically impossible.

Instead of applying the paste above described, there may be incorporated in the mix of which the electrode is formed, such chemicals as under the influence of the curing heat or the heat of the electric furnace when the electrode is in use will produce the required glaze on the surfaces. Examples of such chemicals are flour-spar, lime and silica, and soda salts and silica. It is perhaps not practical to produce by this specific method as thick a protective coating as by the first method suggested, but on the other hand, the coating produced will be even more firmly secured in place, and will increase in thickness as the electrode is wasted away. Or, instead of applying the material in the form of a paste or plastic layer, suitable material, such, for example, as heretofore mentioned, may be embedded or forced into the suitably prepared surface of the green carbon electrode.

The common characteristic of the several methods of procedure above described is the application to the green, uncured and therefore plastic, carbon electrode, of such material as under the influence of the heat necessary for the curing of the electrode or of the heat generated in the electric furnace will produce either by mere fusion or by chemical change a slag producing protective coating upon the surface of the electrode.

Having described my invention, I claim:

1. The herein described process of applying a protective coating to an electric furnace carbon electrode, which consists in applying to a green unbaked electrode a substance such as, when said electrode is subjected to the required heat, will produce a slag-producing protective coating on the surface of said electrode; and in then subjecting the electrode with this material applied to it to the required heat.

2. The herein described process of applying a protective coating to an electric furnace carbon electrode, which consists in applying to the surface of a green unbaked carbon electrode a paste comprising a binder and a chemical such as will under the influence of the curing heat produce a slag forming protective coating on the surface of said electrode; subsequently subjecting said paste-covered electrode to the action of the usual curing heat.

In testimony whereof, I hereunto affix my signature in the presence of two witnesses.

JOSEPH L. K. SNYDER.

Witnesses:
   D. L. ORDWAY,
   R. L. SEABURY.